Patented Jan. 14, 1941

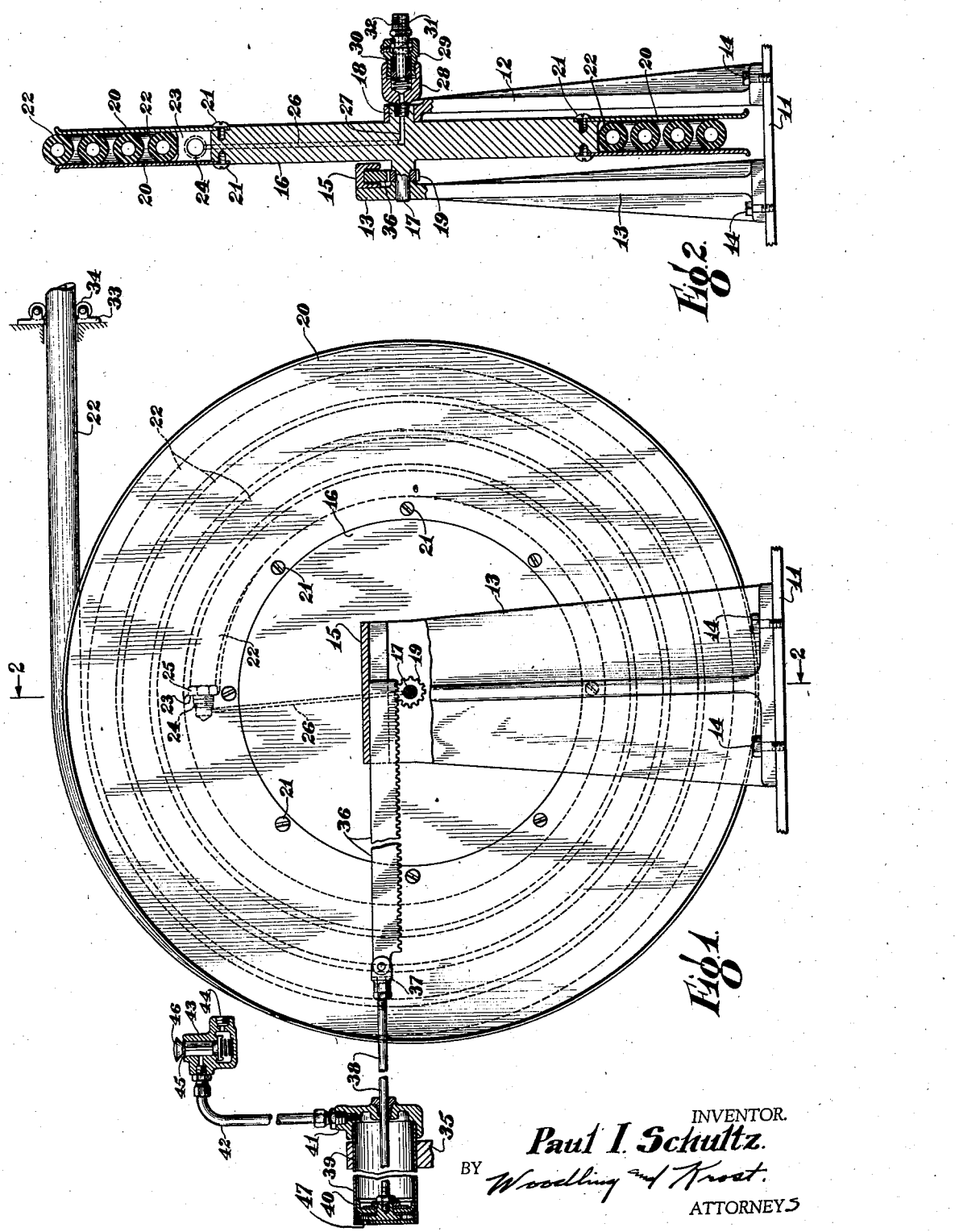

2,228,370

UNITED STATES PATENT OFFICE 2,228,370

HOSE REEL

Paul I. Schultz, Cleveland, Ohio, assignor to United States Air Compressor Company, a corporation of Ohio Application January 6, 1939, Serial No. 249,629

5 Claims. (Cl. 299—78)

My invention relates to reels and more particularly to self-winding reels.

In devices having a hose connected to a source of fluid there are presented several problems in storing of the hose in a limited space, in having the hose maintained in communication with the source of fluid, in having the hose readily extendable for use, and in having the hose readily retracted from its extended position when out of use.

It is an object of my invention to provide a reel for receiving a hose and for permitting the extension of the hose readily from the reel.

Another object is to provide a reel arranged to provide communication from the hose coiled thereon to a source of fluid and for maintaining the communication during the rotation of the reel.

Another object is to provide a device for maintaining a hose revolving upon a rotating reel in constant communication with a source of fluid, the hose remaining connected to the source of fluid to deliver fluid when coiled, uncoiled, or partially coiled.

Another object is to provide a reel arrangement in which there is no tendency for the reel to recoil the hose when the hose is pulled outwardly, thus making it unnecessary for the operator to hold the hose out in its extended position.

Another object is to provide a reel that is rotated to coil the hose by the operation of a driving mechanism but which is not so rotated to coil the hose when the hose is being pulled outwardly.

Another object is to provide a device having an improved arrangement for coiling a hose upon a rotatable reel so that the hose can be unreeled freely and without tension by pulling the hose outwardly.

Another object is to provide an improved connection for a hose coiled upon a reel.

Another object is the arrangement of a device for readily turning the reel by operating a driving mechanism to retract the hose from its extended position.

Another object is to provide an improved hose reel mechanically operated and readily controlled in use.

A further object is to provide an improved reel having an increased efficiency, operating in a novel manner, and giving a heretofore unknown result.

A still further object is to provide a device simple in operation, economical in structure, and rendering advantages heretofore unobtainable.

Other objects and a fuller understanding of my invention may be had by referring to the following description and claims, taken in conjunction with the accompanying drawing, in which:

Figure 1 is a side elevational view of my device without portions shown in cross section and other portions shown in dotted lines to show the relationship of the several parts.

Figure 2 is a cross-sectional view taken through the line 2—2 of Figure 1.

My device may be mounted within a housing, or may be mounted upon a supporting platform. One of the common uses for a hose in communication with a source of fluid is a lubricant dispensing device wherein a hose in communication with a source of lubricant is readily extendable and flexible for dispensing the lubricant to the mechanical parts to be lubricated. In such an arrangement it is preferable to store the hose in a housing provided in the dispensing device for receiving the hose when in its retracted position and out of use. It is also desirable that only so much of the hose as is necessary be extended from the housing and all surplus length of hose be retained in the housing.

With reference to Figures 1 and 2 there are shown two upright supports 12 and 13 secured to the bottom wall of the casing 11 by means of the bolts 14. The supports 12 and 13 are spaced apart and have openings extending through their upper ends to provide bearings for the hub shafts 17 and 18 extending axially of a reel body 16. The upright support 13 has a channel guide 15 secured by welding or other suitable means upon one side of its upper end and positioned intermediate the upright 13 and the reel body 16. A pinion 19 is non-rotatively secured by a key or other suitable means to the shaft 17 so that rotation of the pinion 19 causes the rotation of the body portion 16 of the reel. The bearing of the shaft 17 and of the shaft 18 within the openings of the uprights 12 and 13 are such that the reel is free to revolve upon its shaft supported by the uprights 12 and 13.

To provide the channel for the hose there are side plates 20 secured to the body 16 by means of the bolts 21. The spacing of the plates 20 is such that the hose 22 readily slides down within the channel formed between the plates 20. The body 16 and side plates 20 therefore form the reel around which the hose 22 may be coiled and uncoiled. For the purpose of clarity of illustration the coils of hose are shown in Figures 1 and 2 as somewhat separated or spaced apart. However, in actual practice the respective coils of hose lie closely one on top of the other, each concentric portion of hose being in engagement with the concentric portion adjacent to it.

The body 16 is provided with a gradually increasing raised portion around a considerable distance of its circumferential periphery, terminating in an abrupt face portion 23 disposed in a plane extending substantially radially of the reel. This raised portion is so arranged as to arcuate on its outer boundary where a side of the hose 22 rests upon it. A threated opening 24 is disposed in the raised portion of the body 16 and extends inwardly from the face portion 23. A threaded hose connection 25 secured to the end of the hose is in turn threadably engaged in the threaded opening 24 to securely anchor the hose 22 to the body portion 16 of the reel. Since the face portion 23 is disposed substantially radially of the reel the mounting of the hose connection holds the hose in proper position for being properly curved around the reel body 16 upon the coiling of the hose 22. By having the hose so disposed at its connection to the reel the coiling and uncoiling of the hose is performed more efficiently and the hose is coiled in a more circular form.

A conduit or opening 26 extends radially from the threaded opening 24 to the axis of the reel where it communicates with the axial conduit or opening 27 which extends axially out through the shaft 18. Since the reel revolves and since the connection with a conduit leading to the source of fluid is stationary it is necessary to provide a swivel assembly for maintaining communication with the axial conduit 27 during the revolving of the reel. As illustrated, the swivel assembly or union comprises three essential parts and may be mounted by screwing the first part 28 upon the end of the shaft 18. The extension or second part 29 has swivelly mounted therein the nipple or third part 31 and the extension or second part 29 is in turn threadably engaged to the first part 28. Suitable packing seals 30 carried within the extension or second part 29 provide a seal between the second part 29 and the nipple 31 which is rotatably secured thereto. A suitable spring holds the packing seals 30 in place and illustrated ball-bearings provide free rotatable movement between the nipple 31 and extension or second part 29. The opening 32 extending through the nipple 31 and the portion 28 provides communication with the axial conduit 27. It is therefore seen that the nipple is adapted to be connected to a conduit leading to a source of fluid and the fluid may pass through the communication provided by the opening 32, the axial conduit 27, the conduit 26, the threaded opening 24, and then into the hose 22. The nipple 31 of the swivel assembly is adapted to be held stationary by its connection with a conduit communicating with the source of fluid, and the parts 29 and 28 secured to the reel rotate with the reel relative to the nipple 31. Therefore the hose reel may be in revolving motion or may be in any of several rotated positions and communication between the hose 22 and the source of fluid is constantly maintained.

The outer end of the hose 22 is disposed outwardly of the casing and to provide for ready retraction of the hose 22 from the casing there is provided an opening in the casing wall. Roller brackets 33 are suitably anchored by a support to the casing wall and rollers 34 are rotatably carried by the brackets 33. The rollers 34 provide a guide and bearing support for the hose 22 in its travel to and from the reel in the operations of being coiled and uncoiled.

A rack 36 is positioned adjacent to the reel with the teeth of the rack 36 enmeshed with the teeth of the pinion 19. The rack 36 is guided in its enmeshed position by the channel guide 15 carried by the upright 13. Longitudinal movement is given to the rack 36 by a compressed fluid or hydraulic system. A cylinder 39 is anchored to a suitable support 35 carried by the reel housing. A piston 40 is slidably mounted within the cylinder 39 in the usual manner. A piston rod 38 secured to the piston 40 extends out through the cylinder head 41 mounted on the end of the cylinder 39. A suitable sealing arrangement seals the piston rod 38 at the opening in the cylinder head 41. The end of piston rod 38 is secured to the rack 36 by means of the connection 37 so that the rack 36 is reciprocated by the rod 38.

An air conduit 42 is connected to the cylinder 39 and in communication with its interior upon the right hand side of the piston 40. There is an opening 47 in the rear end of the cylinder to permit air to escape from the cylinder in back of the piston 40 as air is introduced into the cylinder 39 from the air conduit 42 governed by a hand operated valve assembly 46. The air inlet 44 in the valve casing 43 of the valve assembly is adapted to be connected with a source of compressed air or other compressed fluid suitable for the purpose of forcibly moving the piston 40 by the introduction of the compressed fluid within the cylinder 39. The arrangement of the valve assembly 46 and the valve casing 43 is such that by pressing the button valve of the valve assembly downward the outlet 45 in which the valve button seats is closed and the compressed fluid flows through the inlet 44 and the conduit 43 into the cylinder 39 and forces the piston 40 back to the position shown in Figure 1. The movement of piston 40 draws the rod 38 and rack 36 backwardly and thus revolves the reel secured to the pinion 19 in a coiling direction. By releasing the button valve of the valve assembly 46 the inlet 44 is blanked and the outlet 45 is opened permitting the compressed air or other fluid in the cylinder to escape. When there is no compressed fluid within the cylinder 39 then the rod 38 may be freely moved through the opening in the cylinder head 41. Since the rod 38 is then free to be reciprocated, the rack 36 may likewise freely reciprocate by revolving the reel and the pinion 19 secured to the reel in an uncoiling direction. To unreel the hose 22 from the reel the valve assembly 46 is released to permit longitudinal movement of the rack 36 and rotation of the pinion 19 and thus the reel is free to revolve in an uncoiling direction as the hose 22 is pulled outwardly between the rollers 34. Only so much of the hose as is necessary is extended and the surplus is maintained in a reeled position. When it is again desired to retract the hose the valve assembly is operated to cause the compressed fluid or hydraulic system to draw the rack 36 backwardly and thus coil the hose 22 around the reel revolving in a coiling direction.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A hose reel having a body portion and a channel portion, said body portion having a raised part extending therefrom, said raised part having an arcuate surface for engaging a side of the hose disposed in said channel portion and having a face portion for engaging an end of said hose, said face portion being disposed in a plane extending substantially radially of said reel, a swivel connection at the axis of said body portion, said swivel connection being externally of said body portion and being adapted to communicate with a source of fluid, the said body portion having an opening extending from said face portion to said swivel connection to provide communication between said source of fluid and the said hose.

2. A hose reel having an arcuate body about which the hose may be coiled and having a channel portion extending from the body within which the coils of hose may be maintained in successive over-laying relationship, said body having a gradually increasing raised portion extending from a portion of its circumferential periphery, said raised portion having an arcuate outer surface adapted to engage a curved longitudinal side of the voiled hose, said raised portion terminating at a face portion disposed in a plane extending substantially radially of the reel, the said face portion being adapted to secure an end portion of the hose in a position tangential of the said body so that the hose may coil in a gradual curve upon said body.

3. A hose reel having an arcuate body about which the hose may be coiled and having a channel portion extending from the body within which the coils of hose may be maintained in successive over-laying relationship, said body having a gradually increasing radial dimension and a radially disposed face extending between the maximum and the minimum peripheral boundary surfaces of the body, the said face being adapted to engage a hose connection disposed tangentially of the body and the body being adapted to engage an external swivel connection disposed at the axis of the body, said body having a conduit disposed therein for providing communication between the hose connection and the swivel connection, the arrangement of the said body, radially disposed face, and channel portion being such that a hose having its inner end secured to the connection at said face may be coiled in a gradually expanding curve to over-lap said inner end and formed in a plurality of over-lying adjacent coils in said channel portion.

4. A hose reel having a central portion about which the hose may be coiled and having a channel portion extending from the central portion within which the coils of hose may be maintained in successive over-laying relationship, said central portion having a raised portion extending outwardly from a portion of its circumferential periphery, said raised portion terminating in a face portion and being adapted to secure in the face portion an end portion of a hose in a position substantially tangential of the central portion of the reel.

5. A hose reel having a central portion about which the hose may be coiled and having a channel portion extending from the central portion within which the coils of hose may be maintained in successive over-laying relationship, said central portion having a raised portion extending outwardly from a portion of its circumferential periphery, said raised portion terminating in a face portion and being adapted to secure in the face portion an end portion of a hose in a position substantially tangential of the central portion of the reel, a swivel connection at the axis of said body portion, said swivel connection being externally of said body portion and being adapted to communicate with a source of fluid, the said body portion having an opening extending from said face portion to said swivel connection to provide communication between said source of fluid and the said hose.

PAUL I. SCHULTZ.